US009776134B2

(12) United States Patent
Uenishi et al.

(10) Patent No.: US 9,776,134 B2
(45) Date of Patent: Oct. 3, 2017

(54) EXHAUST PURIFICATION SYSTEM OF INTERNAL COMBUSTION ENGINE

(71) Applicants: Toru Uenishi, Susono (JP); Kohei Yoshida, Gotenba (JP); Mikio Inoue, Susono (JP)

(72) Inventors: Toru Uenishi, Susono (JP); Kohei Yoshida, Gotenba (JP); Mikio Inoue, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 181 days.

(21) Appl. No.: 14/648,144

(22) PCT Filed: Nov. 29, 2012

(86) PCT No.: PCT/JP2012/080910
§ 371 (c)(1),
(2) Date: May 28, 2015

(87) PCT Pub. No.: WO2014/083648
PCT Pub. Date: Jun. 5, 2014

(65) Prior Publication Data
US 2015/0314237 A1 Nov. 5, 2015

(51) Int. Cl.
*F01N 3/00* (2006.01)
*B01D 53/94* (2006.01)
(Continued)

(52) U.S. Cl.
CPC ..... *B01D 53/9431* (2013.01); *B01D 53/9422* (2013.01); *B01D 53/9495* (2013.01);
(Continued)

(58) Field of Classification Search
USPC .......... 60/274, 276, 285, 286, 297, 301, 303
See application file for complete search history.

(56) References Cited

U.S. PATENT DOCUMENTS

| 5,592,919 | A  | * | 1/1997  | Morikawa | F02D 35/023 |
|           |    |   |         |          | 123/435     |
| 7,007,685 | B2 | * | 3/2006  | Ichihashi | F02D 41/1401 |
|           |    |   |         |          | 123/683     |
| 8,820,054 | B2 | * | 9/2014  | Bisaiji  | F01N 3/0814 |
|           |    |   |         |          | 60/276      |
| 8,944,037 | B2 | * | 2/2015  | Yonekawa | F02D 41/0295 |
|           |    |   |         |          | 123/672     |
| 9,494,072 | B2 | * | 11/2016 | Sakurai  | F02D 41/1454 |

(Continued)

FOREIGN PATENT DOCUMENTS

| JP | 2008-231966 A  | 10/2008 |
| WO | WO 2011/114499 A1 | 9/2011 |

(Continued)

*Primary Examiner* — Binh Q Tran
(74) *Attorney, Agent, or Firm* — Finnegan, Henderson, Farabow, Garrett & Dunner, LLP

(57) ABSTRACT

In an internal combustion engine of the present invention, an exhaust purification catalyst (13) and a hydrocarbon supply valve (15) are disposed in an engine exhaust path, and $NO_x$ contained in exhaust gas is purified by injecting hydrocarbon from the hydrocarbon supply valve (15) at a predetermined cycle. With respect to the injection amount per unit time of the hydrocarbon from the hydrocarbon supply valve (15), there is a difference provided between the first half and the second half of one injection time period, and in the first-half injection time period (Y), the injection amount per unit time of hydrocarbon is made to be less as compared to the second-half injection time period (X).

8 Claims, 13 Drawing Sheets

(51) Int. Cl.
*F01N 3/36* (2006.01)
*F01N 3/08* (2006.01)
*F01N 13/00* (2010.01)

(52) U.S. Cl.
CPC ......... *F01N 3/0842* (2013.01); *F01N 3/0871* (2013.01); *F01N 3/36* (2013.01); *F01N 13/0097* (2014.06); *B01D 2255/1021* (2013.01); *B01D 2255/1023* (2013.01); *B01D 2255/1025* (2013.01); *B01D 2255/202* (2013.01); *B01D 2255/204* (2013.01); *B01D 2255/2065* (2013.01); *B01D 2255/91* (2013.01); *B01D 2257/404* (2013.01); *F01N 2240/30* (2013.01); *F01N 2610/03* (2013.01)

(56) References Cited

U.S. PATENT DOCUMENTS

| | | |
|---|---|---|
| 2010/0037596 A1 | 2/2010 | Toshioka et al. |
| 2012/0096841 A1 | 4/2012 | Hayakawa et al. |
| 2012/0131908 A1 | 5/2012 | Bisaiji et al. |
| 2012/0275963 A1* | 11/2012 | Umemoto .......... B01D 53/9409 422/170 |
| 2013/0192212 A1 | 8/2013 | Umemoto et al. |

FOREIGN PATENT DOCUMENTS

| | | |
|---|---|---|
| WO | WO 2011/125098 A1 | 10/2011 |
| WO | WO 2012/029189 A1 | 3/2012 |

* cited by examiner

EXHAUST PURIFICATION SYSTEM OF INTERNAL COMBUSTION ENGINE

CROSS REFERENCE TO RELATED PATENT APPLICATIONS

This application is a national phase of International Application No. PCT/JP2012/080910, filed on Nov. 29, 2012, which is incorporated herein in its entirety by reference.

TECHNICAL FIELD

The present invention relates to an exhaust purification system of an internal combustion engine.

BACKGROUND ART

Known in the art is an internal combustion engine in which an exhaust purification catalyst is arranged in an engine exhaust passage and a hydrocarbon feed valve is arranged upstream of the exhaust purification catalyst in the engine exhaust passage, a precious metal catalyst is carried on an exhaust gas flow surface of the exhaust purification catalyst and a basic exhaust gas flow surface part is formed around the precious metal catalyst, and hydrocarbons are injected from the hydrocarbon feed valve by a predetermined period at the time of engine operation to thereby remove the $NO_x$ which is contained in the exhaust gas (for example, see PTL 1). In this internal combustion engine, even if the temperature of the exhaust purification catalyst becomes high, a high $NO_x$ purification rate can be obtained.

CITATION LIST

Patent Literature

PTL 1: WO2011/14499A1

SUMMARY OF INVENTION

Technical Problem

In this regard, in this internal combustion engine, if increasing the amount of injection of hydrocarbons from the hydrocarbon feed valve so as to further promote the $NO_x$ removal action, sometimes the hydrocarbons will slip through the exhaust purification catalyst. In this case, there will no longer being any meaning to increasing the amount of injection of hydrocarbons from the hydrocarbon feed valve. In this case, the hydrocarbons slip through the exhaust purification catalyst when increasing the amount of injection of hydrocarbons in this way because the increased hydrocarbons are not effectively utilized for removing the $NO_x$.

An object of the present invention is to provide an exhaust purification system of an internal combustion engine which effectively utilizes the hydrocarbons which are injected from the hydrocarbon feed valve for removal of $NO_x$ and thereby can reduce the amount of consumption of hydrocarbons while obtaining a high $NO_x$ purification rate.

Solution to Problem

According to the present invention, there is provided an exhaust purification system of an internal combustion engine in which an exhaust purification catalyst is arranged in an engine exhaust passage, a hydrocarbon feed valve is arranged in the engine exhaust passage upstream of the exhaust purification catalyst, a precious metal catalyst is carried on an exhaust gas flow surface of the exhaust purification catalyst, a basic exhaust gas flow surface part is formed around the precious metal catalyst, the exhaust purification catalyst has a property of reducing $NO_x$ which is contained in an exhaust gas when making a concentration of hydrocarbons flowing into the exhaust purification catalyst vibrate within a predetermined range of amplitude and within a predetermined range of period and has a property of being increased in storage amount of $NO_x$ which is contained in the exhaust gas if making the vibration period of the hydrocarbon concentration longer than the predetermined range, and hydrocarbons are injected from the hydrocarbon feed valve by a period within the predetermined range at the time of engine operation to thereby remove $NO_x$ which is contained in the exhaust gas, wherein a difference is set between a first part and second part of one injection period with respect to an injection amount of hydrocarbons in each injection when hydrocarbons are repeatedly injected from the hydrocarbon feed valve by a period within the predetermined range, in the first part injection period, the amount of injection of hydrocarbons per unit time is made an injection amount required for making an air-flow ratio of the exhaust gas flowing into the exhaust purification catalyst rich, and in the second part injection period, an injection action of hydrocarbons is continued over a longer time than the first part injection period in a state where the amount of injection of hydrocarbons per unit time is made an injection amount smaller than the first part injection period.

Advantageous Effects of Invention

It is possible to reduce the amount of consumption of hydrocarbons for removing $NO_x$ while obtaining a high $NO_x$ purification rate.

DESCRIPTION OF EMBODIMENTS

Figure 1:
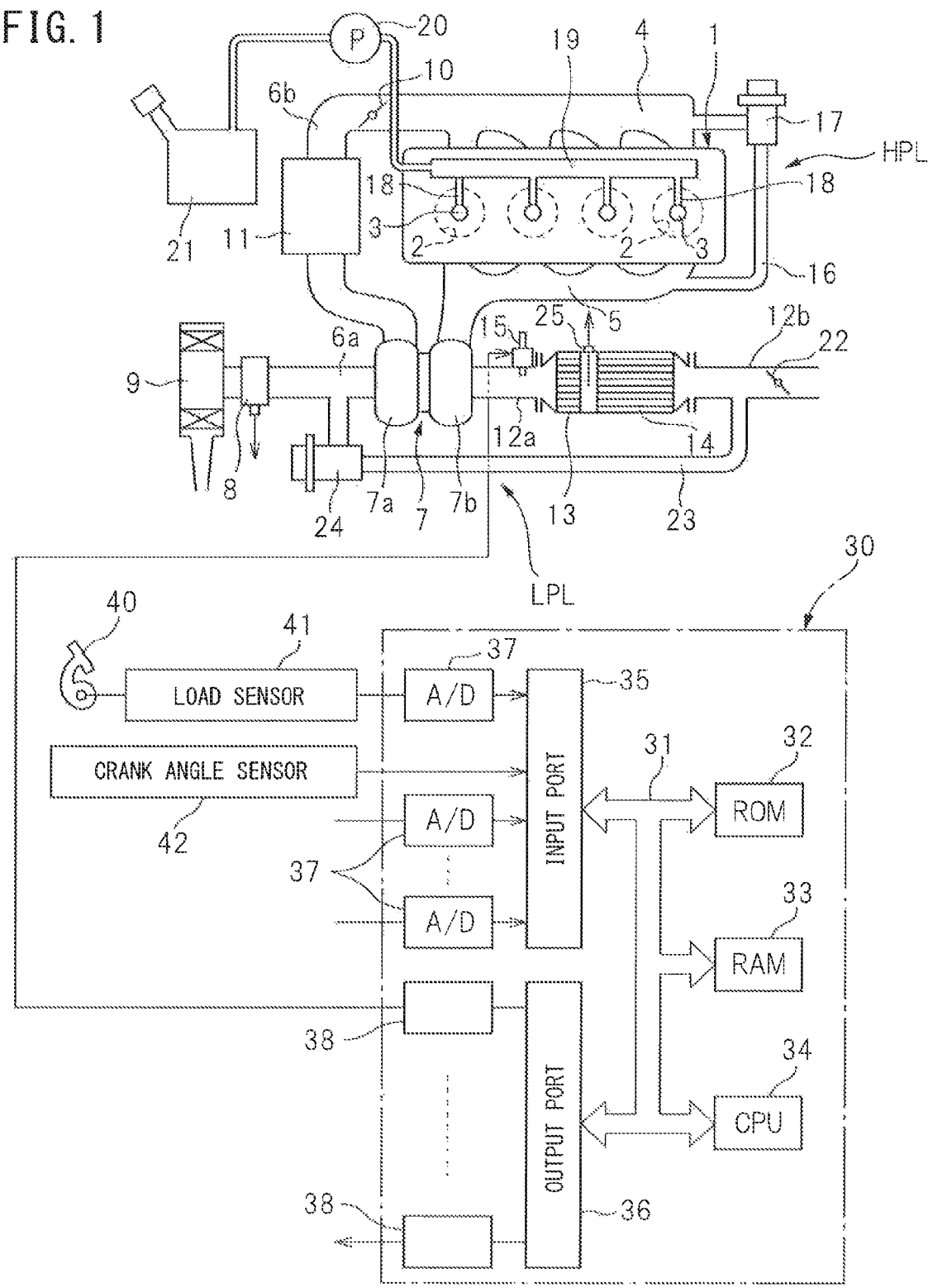
FIG. 1 is an overall view of a compression ignition type internal combustion engine.

FIG. 1 is an overall view of a compression ignition type internal combustion engine. Referring to FIG. 1, 1 indicates an engine body, 2 a combustion chamber of each cylinder, 3 an electronically controlled fuel injector for injecting fuel in to each combustion chamber 2, 4 an intake manifold, and 5 an exhaust manifold. The intake manifold 4 is connected through an intake duct 6b to the outlet of a compressor 7a of an exhaust turbocharger 7, while the inlet of the compressor 7a is connected through an intake duct 6a and an intake air amount detector 8 to an air cleaner 9. Inside the intake duct 6a, a throttle valve 10 which is driven by an actuator is arranged. Around the intake duct 6b, a cooling device 11 is arranged for cooling the intake air which flows through the inside of the intake duct 6b. In the embodiment which is shown in FIG. 1, the engine cooling water is guided to the inside of the cooling device 11 where the engine cooling water is used to cool the intake air.

On the other hand, the exhaust manifold 5 is connected to the inlet of an exhaust turbine 7b of the exhaust turbocharger 7, and the outlet of the exhaust turbine 7b is connected through an exhaust pipe 12a to the inlet of an exhaust purification catalyst 13. A particulate filter 14 is arranged downstream of the exhaust purification catalyst 13, and the outlet of the particulate filter 14 is connected to an exhaust pipe 12b. Upstream of the exhaust purification catalyst 13 inside the exhaust pipe 12a, a hydrocarbon feed valve 15 is arranged for feeding hydrocarbons comprised of diesel oil or other fuel used as fuel for a compression ignition type internal, combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. An electronically controlled EGR control valve 17 is arranged in the EGR passage 16. Further, each fuel injector 3 is connected through a fuel feed tube 18 to a common rail 19. This common rail 19 is connected through an electronically controlled variable discharge fuel pump 20 to a fuel tank 21. The fuel which is stored inside of the fuel tank 21 is fed by the fuel pump 20 to the inside of the common rail 19. The fuel which is fed to the inside of the common rail 19 is fed through each fuel feed tube 18 to the fuel injector 3.

On the other hand, downstream of the particulate filter 14 inside of the exhaust pipe 12b, an exhaust control valve 22 which is driven by an actuator is arranged. The inside of the exhaust pipe 12b between this exhaust control valve 22 and the particulate filter 14 is connected through an EGR passage 23 to the intake pipe 6a. Inside this EGR passage 23, an EGR control valve 24 is arranged. In this way, in the embodiment which is shown in FIG. 1, an exhaust gas recirculation system HPL which is comprised of the EGR passage 16 and EGR control valve 17 and an exhaust gas recirculation system LPL which is comprised of the EGR passage 23 and EGR control valve 24, that is, two exhaust gas recirculation systems, are provided. In this case, as will be understood from FIG. 1, in the exhaust gas recirculation system HPL, the exhaust gas in the exhaust manifold 5 is recirculated, while in the exhaust gas recirculation system LPL, the exhaust gas in the exhaust pipe 12a downstream of the particulate filter 14 is recirculated.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 25 is arranged for detecting the temperature of the exhaust purification catalyst 13, and the output signals of the temperature sensor 25 and intake air amount detector 8 are input through respectively corresponding AD converters 37 to the input port 35. Further, the accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, actuator for driving the throttle valve 10, hydrocarbon feed valve 15, EGR control valves 17, 24, fuel pump 20, and actuator for driving the exhaust control valve 22.

Figure 2:
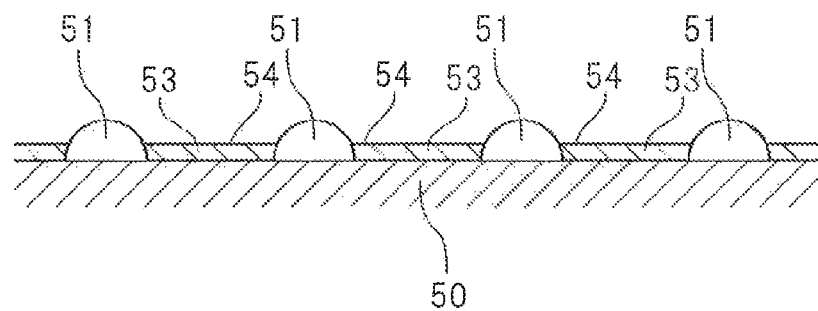
FIG. 2 is a view which schematically shows the surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalyst 51 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_x$. In addition, in the exhaust purification catalyst 13 shown in FIG. 2, cerium Ce is contained in the basic layer 53.

In this regard, the exhaust gas flows along the top of the catalyst carrier 50, so the precious metal catalysts 51 can be said to be carried on the exhaust gas flow surface of the exhaust purification catalyst 13. Further, the surface of the basic layer 53 exhibits basicity, so the surface of the basic layer 53 is called the "basic exhaust gas flow surface parts 54". On the other hand, in FIG. 2, the precious metal catalyst 51 is comprised of platinum Pt. Note that, in this case, in addition to platinum Pt, rhodium Rh or palladium Pd may be further carried on the catalyst carrier 50 of the exhaust purification catalyst 13.

Figure 3:
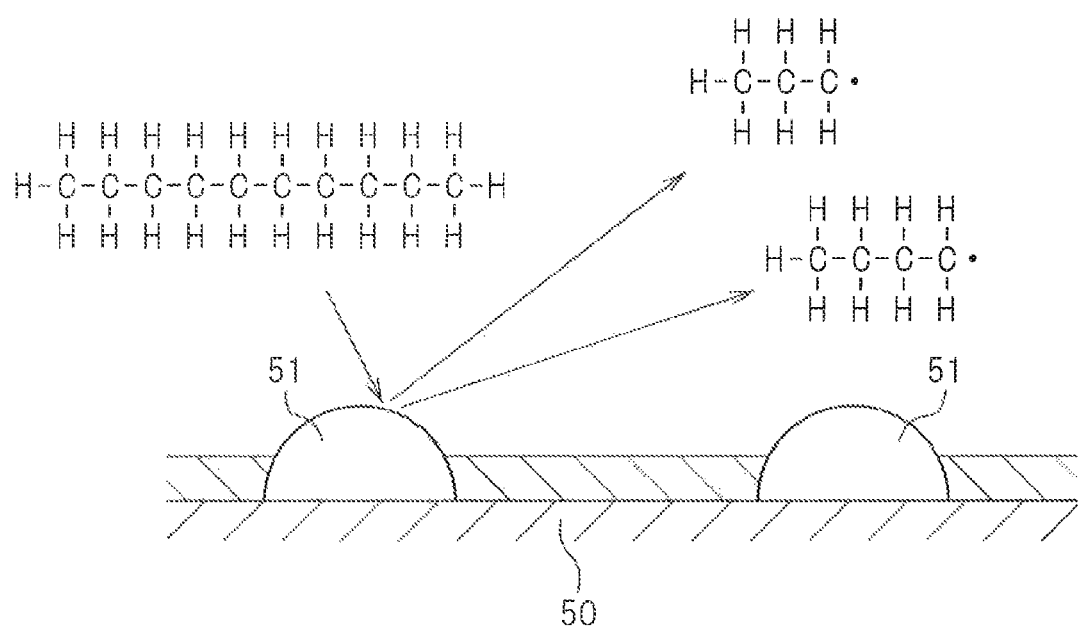
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the catalyst 51.

Figure 4:
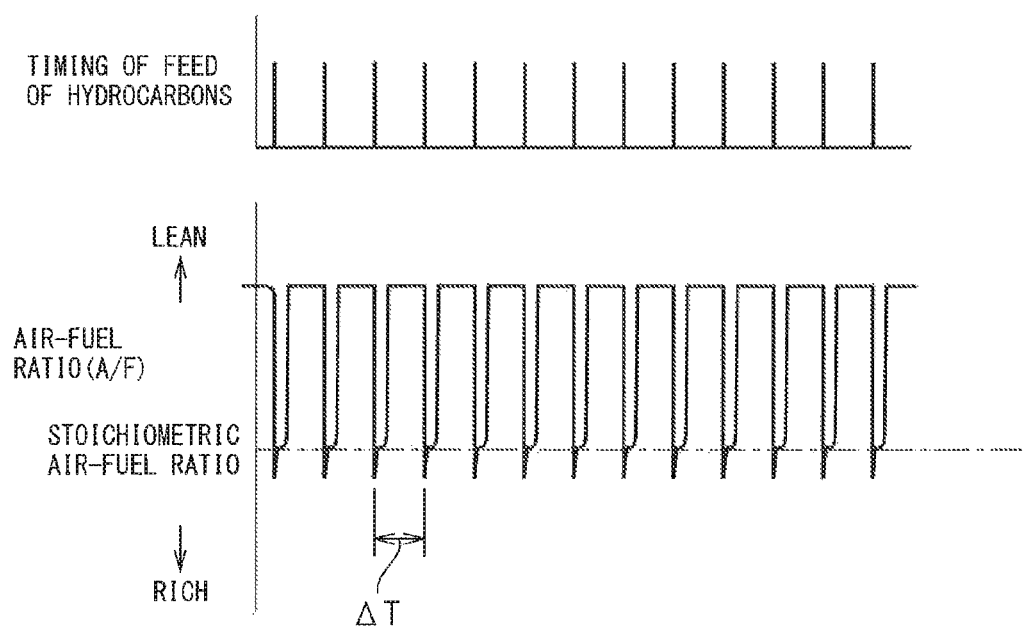
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F) of the exhaust gas which flows into the exhaust purification catalyst 13. Note that, the change in the air-fuel ratio (A/F) depends on the change in concentration of the hydrocarbons in the exhaust gas which flows into the exhaust purification catalyst 13, so it can be said that the change in the air-fuel ratio (A/F) shown in FIG. 4 expresses the change in concentration of the hydrocarbons. However, if the hydrocarbon concentration becomes higher, the air-fuel ratio (A/F) becomes smaller, so, in FIG. 4, the more to the rich side the air-fuel ratio (A/F) becomes, the higher the hydrocarbon concentration. As can be seen from FIG. 4, in the present invention, hydrocarbons are repeatedly injected from the hydrocarbon feed valve 15 with the period ΔT.

Figure 6:
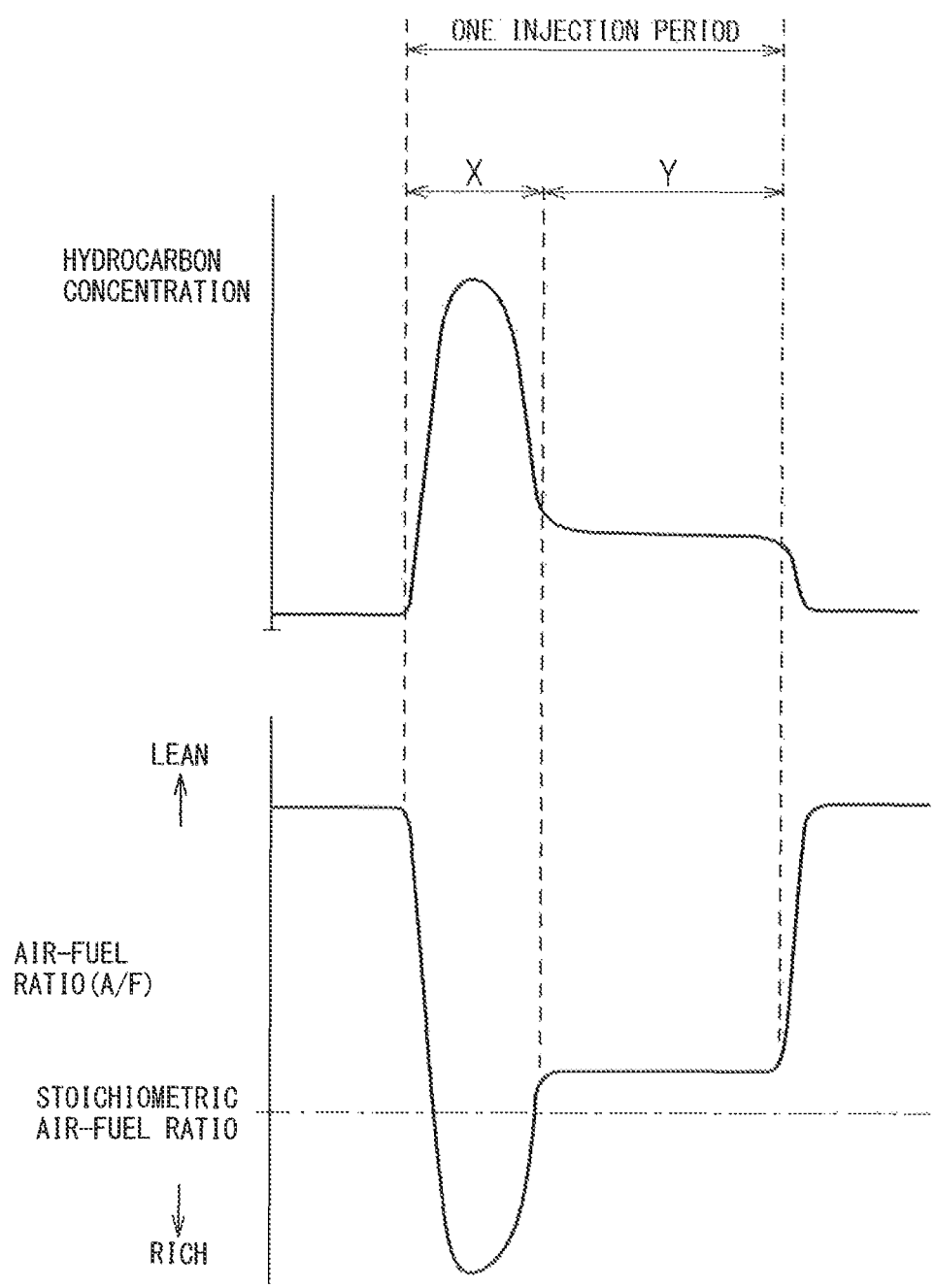
FIG. 6 is a view which shows changes in a concentration of hydrocarbon in exhaust gas flowing into an exhaust purification catalyst and an air-fuel ratio of exhaust gas flowing into an exhaust purification catalyst.

As shown in FIG. 4, if hydrocarbons are injected once from the hydrocarbon feed valve 15, the air-fuel ratio (A/F) of the exhaust gas flowing into the exhaust purification catalyst 13 changes according to that. FIG. 6 shows enlarged the change in the air-fuel ratio (A/F) at this time, that is, when the action of injection of hydrocarbons is performed once. Note that, FIG. 6 also shows the change in the concentration of hydrocarbons in the exhaust gas flowing into the exhaust purification catalyst 13. As shown in FIG. 6, in the present invention, the concentration of hydrocarbons in the exhaust gas flowing into the exhaust purification catalyst 13 is made different between a first part X and second part Y of one injection period. In the first part injection period X, the concentration of hydrocarbons is made a concentration which is required for making the air-fuel ratio of the exhaust gas flowing into the exhaust purification catalyst 13 rich, while in the second part injection period Y, the action of injection of hydrocarbons is continued over a period longer than the first part injection period X in a state where the concentration of hydrocarbons is made a concentration which is lower than the first part injection period X.

Note that, the concentration of hydrocarbons in exhaust gas flowing into the exhaust purification catalyst 13 is proportional to the amount of injection of hydrocarbons from the hydrocarbon feed valve 15 per unit time. Therefore, in other words, in the present invention, a difference is provided in the amount of injection of hydrocarbons from the hydrocarbon feed valve 15 per unit time between a first part X and a second part Y in one injection period, in the first part injection period X, the amount of injection of hydrocarbons per unit time is made an injection amount which is required for making the air-fuel ratio of the exhaust gas flowing into the exhaust purification catalyst 13 rich, while in the second part injection period Y, the action of injection of hydrocarbons is continued over a period longer than the first part injection period X in a state where the amount of injection of hydrocarbons per unit time is made an injection amount which is smaller than the first part injection period X.

Further, in the present invention, as shown in FIG. 6, when shifting from the first part injection period X to the second part injection period Y, the concentration of hydrocarbons in the exhaust gas flowing into the exhaust purification catalyst 13 falls to the concentration of hydrocarbons in the second part injection period Y, then is maintained at the concentration of hydrocarbons in the second part injection period Y, and the concentration of hydrocarbons during the second part injection period Y is maintained at the same concentration. That is, in other words, when shifting from the first part injection period X to the second part injection period Y, the amount of injection of hydrocarbons from the hydrocarbon feed valve 15 per unit time falls to the amount of injection of hydrocarbons per unit time in the second part injection period Y, then is maintained at the amount of injection of hydrocarbons per unit time in the second part injection period Y, and the amount of injection of hydrocarbons per unit time during the second part injection period Y is maintained at the same injection amount.

Figure 5:
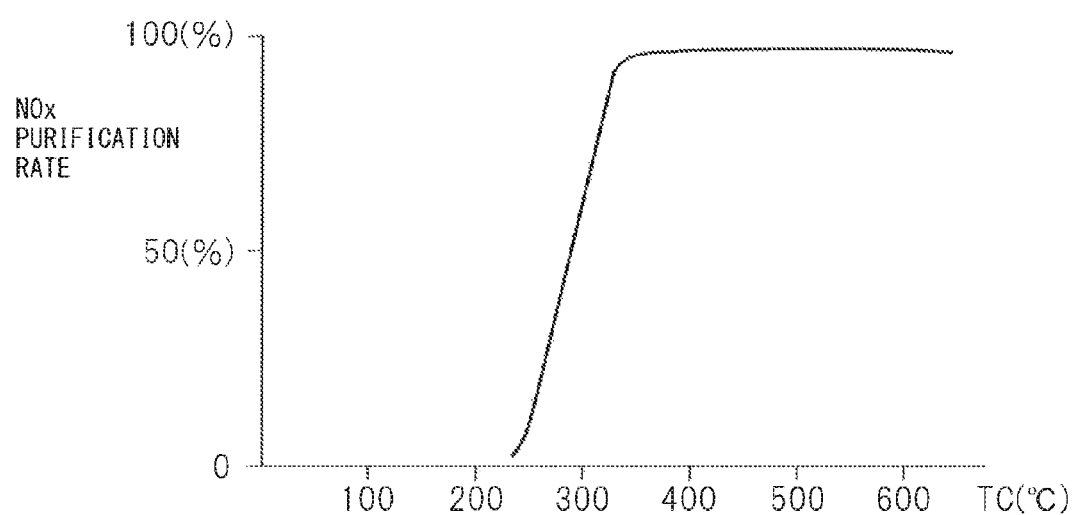
FIG. 5 is a view which shows an $NO_x$ purification rate.

FIG. 5 shows the $NO_x$ purification rate by the exhaust purification catalyst 13 with respect to the catalyst temperatures TC of the exhaust purification catalyst 13 when periodically making the concentration of hydrocarbons which flow into the exhaust purification catalyst 13 and the air-fuel ratio (A/F) of the exhaust gas which flows to the exhaust purification catalyst 13 change as shown in FIG. 6. It is learned that if making the concentration of hydrocarbons which flow into the exhaust purification catalyst 13 and the air-fuel ratio (A/F) of the exhaust gas which flows to the exhaust purification catalyst 13 change as shown in FIG. 6, an extremely high $NO_x$ purification rate is obtained even in a 400° C. or higher high temperature region as shown in FIG. 5.

Next, the reaction which is presumed to occur on the exhaust purification catalyst 13 when making the concentration of hydrocarbons which flow into the exhaust purification catalyst 13 and the air-fuel ratio (A/F) of the exhaust gas which flows to the exhaust purification catalyst 13 change as shown in FIG. 6 will be explained with reference to FIGS. 7A to 7C. Note that these FIGS. 7A to 7C schematically show a surface part of the catalyst carrier 50 of the exhaust purification catalyst 13.

Figure 7A:
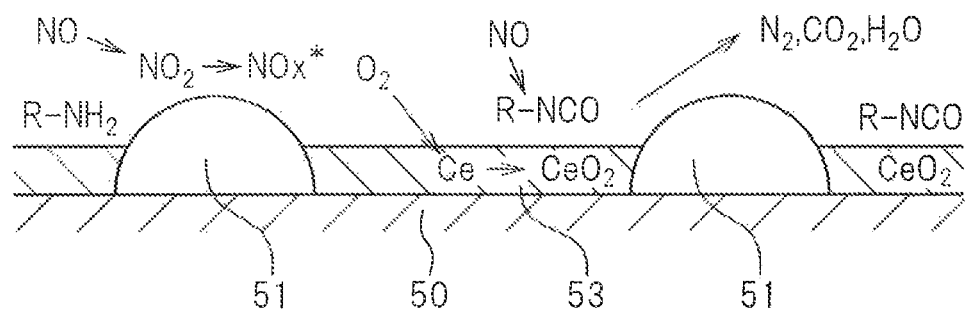
FIGS. 7A, 7B and 7C are views for explaining an oxidation reduction reaction in an exhaust purification catalyst.

FIG. 7A shows when the concentration of hydrocarbons which flow into the exhaust purification catalyst 13 is low, that is, the injection of hydrocarbon is not carried out. FIG. 7B shows the first part injection period X during which the injection of hydrocarbon is carried out, while FIG. 7C shows the second part injection period Y during which the injection of hydrocarbon is carried out.

Now, when the injection of hydrocarbon from the hydrocarbon feed valve 15 is not carried out, the air-fuel ratio of the exhaust gas which flows into the exhaust purification catalyst 13 is lean, so the exhaust gas which flows into the exhaust purification catalyst 13 is in a state of oxygen excess. At this time, part of the NO which is contained in the exhaust gas deposits on the exhaust purification catalyst 13, while part of the NO which is contained in the exhaust gas, as shown in FIG. 7A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_x^*$". On the other hand, at this time, cerium Ce existing in the basic layer 53 deprives the exhaust gas of oxygen and becomes ceria $CeO_2$.

Figure 7B:
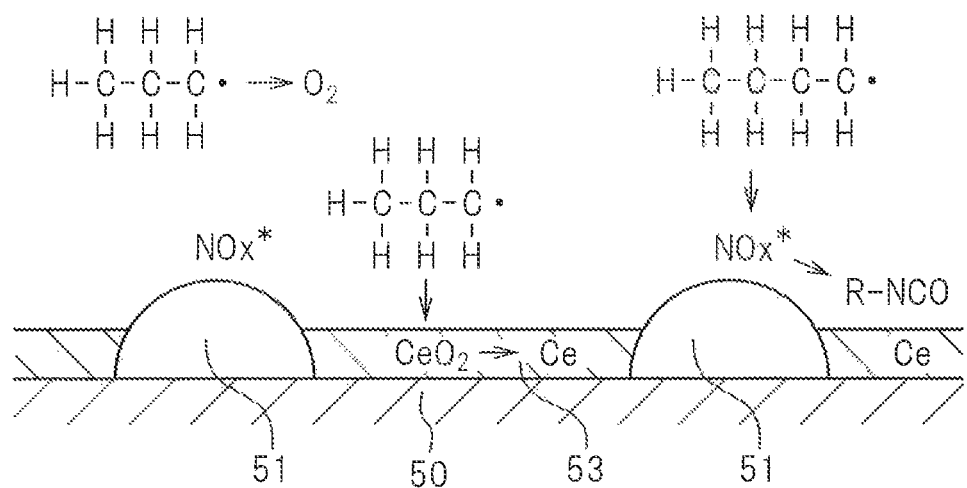
Figure 7C:
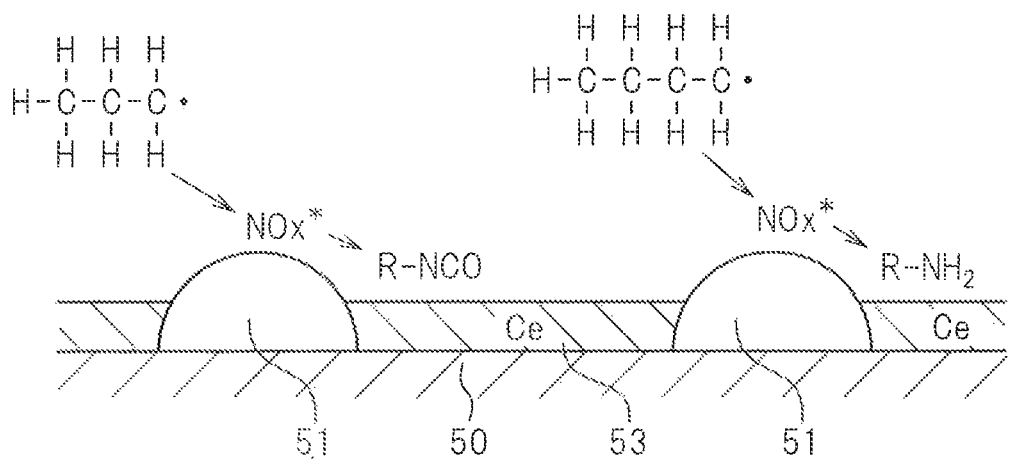

On the other hand, if hydrocarbons are fed from the hydrocarbon feed valve 15, the majority of these hydrocarbons are reformed in the exhaust purification catalyst 13 as shown in FIG. 3 and become radicals as shown in FIGS. 3 and 7B. At this time, that is, in the first part injection period X, the hydrocarbons fed from the hydrocarbon feed valve 15 and the reformed hydrocarbons, on one hand, react with oxygen contained in the exhaust gas and are oxidized and, on the other hand, deprive ceria $CeO_2$ existing in the basic layer 53 of oxygen and are oxidized. In this way, in the first part injection period X, the hydrocarbons injected from the hydrocarbon feed valve 15 are used to consume oxygen.

In this regard, if the state of a high oxygen concentration around the active $NO_x^*$ continues for a constant time or more after the active $NO_x^*$ is produced, the active $NO_x^*$ is oxidized and is absorbed in the form of nitrate ions $NO_3^-$ inside the basic layer 53. However, if the hydrocarbon concentration around the active $NO_x^*$ is made higher before this constant time elapses, as shown in FIG. 7C, the active $NO_x^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound P—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 7C, the majority of the reducing intermediates which are held or adsorbed on the surface of the basic layer 53 is believed to be the isocyanate compound R—NCO and amine compound R—$NH_2$.

On the other hand, as shown in FIG. 7C, if the hydrocarbons HC are adhered around the produced reducing intermediates, the reducing intermediates are blocked by the hydrocarbons HC and the reaction will not proceed any further. In this case, if the concentration of hydrocarbons which flow into the exhaust purification catalyst 13 is lowered and then the hydrocarbons which are adhered around the reducing intermediates will be oxidized and consumed and thereby the concentration of oxygen around the reducing intermediates becomes higher, as shown in FIG. 7A, the reducing intermediates react with the $NO_x$ in the exhaust gas and the active $NO_x^*$, or react with the surrounding oxygen, or break down on their own. Due to this, as shown in FIG. 7A, the reducing intermediates R—NCO and R—$NH_2$ are converted to $N_2$, $CO_2$, and $H_2O$, therefore the $NO_x$ is removed.

In this way, in the exhaust purification catalyst 13, by making the concentration of hydrocarbons which flow into the exhaust purification catalyst 13 higher, reducing intermediates are produced. When the oxygen concentration is raised after the concentration of hydrocarbons which flow into the exhaust purification catalyst 13 is lowered, the reducing intermediates react with the $NO_x$ in the exhaust gas, the active $NO_x^*$ and oxygen, or break down on their own whereby the $NO_x$ is removed. That is, in order for the exhaust purification catalyst 13 to remove the $NO_x$, the concentration of hydrocarbons which flow into the exhaust purification catalyst 13 has to be periodically changed.

As will be understood from the above explanation, in the present invention, the reducing intermediate has a central role in removal of $NO_x$. Therefore, the method of producing the reducing intermediate in the present invention will be explained in a bit more detail. That is, when hydrocarbons which are injected from the hydrocarbon feed valve 15 flow into the exhaust purification catalyst 13, if there is a large amount of oxygen around the hydrocarbons, that is, if the inside of the exhaust purification catalyst 13 is an oxidizing atmosphere, as shown in FIG. 7B, the hydrocarbons react with the oxygen to be oxidized. As opposed to this, when there is no oxygen around the hydrocarbons, as shown in FIG. 7C, the hydrocarbons react with the active $NO_x^*$ whereby a reducing intermediate is produced. That is, to produce a reducing intermediate, at least the surface of the exhaust purification catalyst 13 has to be made a reducing atmosphere. For this reason, in the present invention, as shown in FIG. 6, in the first part injection period X, a large amount of hydrocarbons is injected from the hydrocarbon feed valve 15 so that the air-fuel ratio of the exhaust gas which flows into the exhaust purification catalyst 13 becomes rich.

If a large amount of hydrocarbons is injected from the hydrocarbon feed valve 15 so that the air-fuel ratio of the exhaust gas which flows into the exhaust purification catalyst 13 becomes rich, as shown in FIG. 7B, the oxygen in the exhaust purification catalyst 13 is consumed by the hydrocarbons. As a result, the surface of the exhaust purification catalyst 13 becomes a reducing atmosphere. Therefore, as shown in FIG. 7C, a reducing intermediate is produced by the hydrocarbons. At this time, hydrocarbons are injected from the hydrocarbon feed valve 15 in exactly the amount which is required for production of the reducing intermediate. The amount of hydrocarbons which is required for production of the reducing intermediate is smaller than the amount of hydrocarbons which is required in the first part injection period X. Therefore, as shown in FIG. 6, the amount of injection of hydrocarbons per unit time in the second part injection period Y is made smaller than the amount of injection in the first part injection period X. That is, in the present invention, the amount of injection of hydrocarbons which is injected in the first part injection period X is the amount required for consuming the oxygen, while the amount of injection of hydrocarbons which is injected per unit time in the second part injection period Y is made an amount required for producing a reducing intermediate which includes nitrogen and hydrocarbons.

Further, to produce a sufficient amount of the reducing intermediate, the second part injection period Y has to be made longer by a certain extent. Therefore, in the present invention, the second part injection period Y is made longer than the first part injection period X. Therefore, in the present invention, in the second part injection period Y, the injection action of hydrocarbons is continued over a period longer than the first part injection period X in a state where the amount of injection of hydrocarbons per unit time is made an injection amount smaller than the first part injection period X. Note that, in the second part injection period Y as well, while small in amount, there is oxygen present around the hydrocarbons, so part of the hydrocarbons is used for consuming this oxygen. Therefore, the air-fuel ratio (A/F) of the exhaust gas which flows into the exhaust purification catalyst 13 in the second part injection period Y changes depending on the partial pressure of the oxygen in the exhaust purification catalyst 13. The optimum air-fuel ratio (A/F) of the exhaust gas which flows into the exhaust purification catalyst 13 in this second part injection period Y is found in advance by experiments. In the example which is shown in FIG. 6, this optimum air-fuel ratio (A/F, is made the lean air-fuel ratio, but this optimum air-fuel ratio (A/F) sometimes also becomes the stoichiometric air-fuel ratio or rich air-fuel ratio.

On the other hand, if, in the first part injection period X, injecting hydrocarbons from the hydrocarbon feed valve 15 so that the air-fuel ratio (A/F) of the exhaust gas which flows into the exhaust purification catalyst 13 becomes rich and the injected hydrocarbons consume oxygen, the surface of the exhaust purification catalyst 13 will become a reducing atmosphere. Therefore, at this time, as shown in FIG. 7B, part of the hydrocarbons will react with the active $NO_x^*$ whereby a reducing intermediate will be produced. That is, in the second part injection period Y, even if maintaining the air-fuel ratio (A/F) of the exhaust gas which flows into the exhaust purification catalyst 13 at the same rich air-fuel ratio as the first part injection period X, a reducing intermediate can be produced. However, if, in this way, maintaining the air-fuel ratio (A/F) of the exhaust gas which flows into the exhaust purification catalyst 13 at the same rich air-fuel ratio as the first part injection period X in the second part injection period Y as well, the amount of hydrocarbons which is fed will become excessive for the amount of hydrocarbons which is used for production of the reducing intermediate. As a result, hydrocarbons will slip through the exhaust purification catalyst 13.

If the hydrocarbons slip through the exhaust purification catalyst 13 in this way, the problem of generation of white smoke arises. Not only that, the problem arises of the slipped through hydrocarbons being sent through the EGR passage 23 of the exhaust gas recirculation system LPL to the inside of the combustion chambers 2 of the cylinders and thereby causing torque fluctuations. To prevent such problems from occurring, in the second part injection period Y, it is necessary to feed hydrocarbons in exactly the amount required for production of the reducing intermediate. Therefore, in the present invention, the amount of injection of hydrocarbons per unit time in the second part injection period Y is made an injection amount which is smaller than the first part injection period X.

Figure 8:
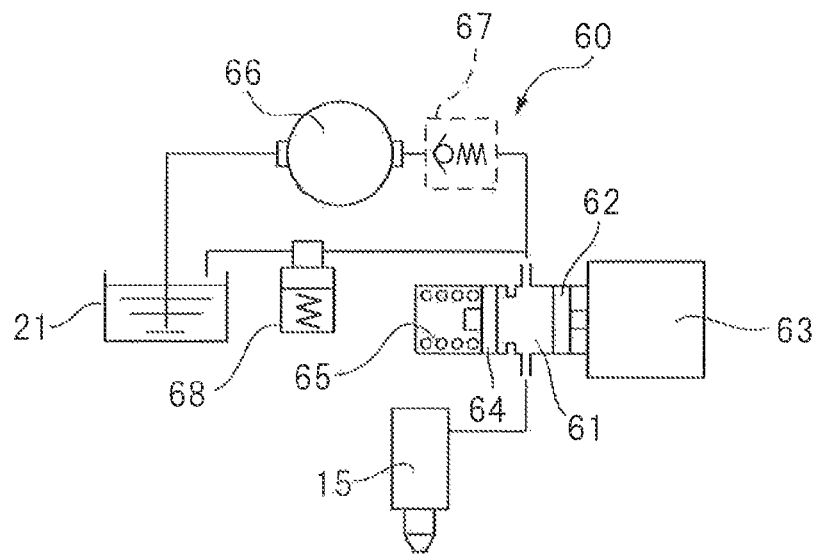
FIG. 8 is an overall view of a schematically illustrated injection pump.

Next, one example of an injection pump which can inject hydrocarbons as shown in FIG. 6 will be explained with reference to FIG. 8. Referring to FIG. 8, the injection pump 60 is comprised of an adjustment chamber 61 which is filled with hydrocarbons, that is, fuel, an adjustment piston 62 for adjusting the volume of the adjustment chamber 61, an actuator 63 for driving the adjustment piston 62, a pressurizing piston 64 for pressurizing the fuel in the adjustment chamber 61, and an elastic member 65 for urging the pressurizing piston 64 toward the adjustment chamber 61. In the example which is shown in FIG. 8, this elastic member 65 is comprised of a compression spring. The fuel inside the fuel tank 21 is pressurized by the pressurizing pump 66, whereupon the pressurized fuel is sent a little at a time to the inside of the adjustment chamber 61 through a check valve 67 which can pass fuel only toward the adjustment chamber 61. The pressurized fuel in the adjustment chamber 61 is, on the one hand, sent into the hydrocarbon feed valve 15 and, on the other hand, is returned through a relief valve 68 which can control the relief pressure to the inside of the fuel tank 21. If the fuel pressure inside the adjustment chamber 61 exceeds the relief pressure of the relief valve 68, the relief valve 68 opens and thereby the fuel pressure inside the adjustment chamber 61 is maintained at the relief pressure of the relief valve 68.

Figure 9:
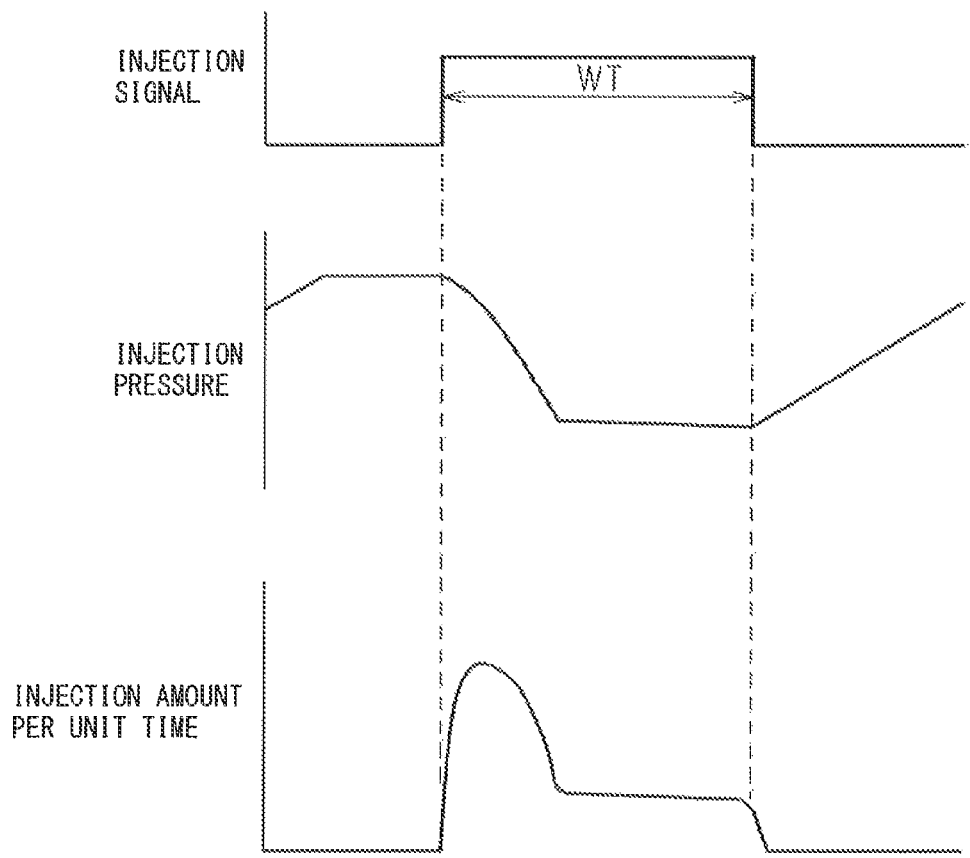
FIG. 9 is a view which shows a change in an injection pressure, etc.

FIG. 9 shows the injection signal to the hydrocarbon feed valve 15, the change in the pressure of the fuel inside the adjustment chamber 61, that is, the injection pressure of the hydrocarbon feed valve 15, and the change in the amount of injection of hydrocarbons from the hydrocarbon feed valve 15 per unit time. The hydrocarbon feed valve 15 opens upon generation of an injection signal whereupon fuel injection from the hydrocarbon feed valve 15 is started. Fuel injection from the hydrocarbon feed valve 15 is continued for the period WT in which the injection signal is generated. The fuel pressure inside the adjustment chamber 61 before fuel injection is started becomes the relief pressure of the relief valve 68. Therefore, the injection pressure of the hydrocarbon feed valve 15 at the start of injection also becomes this relief pressure. Further, at this time, the pressurizing piston 64 retracts against the spring force of the elastic member 65 until the furthest position from the adjustment chamber 61.

Next, if fuel injection is started, the fuel pressure inside the adjustment chamber 61 falls and, along with this, the injection pressure of the hydrocarbon feed valve 15 also falls. In this regard, if the fuel pressure inside the adjustment chamber 61 falls to a certain fuel pressure which is determined by the spring force of the elastic member 65, the pressurizing piston 64 moves toward the adjustment chamber 61 as the amount of fuel in the adjustment chamber 51 decreases. While the pressurizing piston 64 is moving, the fuel pressure inside the adjustment chamber 61 is substantially maintained at a constant fuel pressure which is determined by the spring force of the elastic member 65. Therefore, if fuel injection is started, the fuel pressure inside the adjustment chamber 61 falls, and the fuel pressure inside the adjustment chamber 61 fails to a certain fuel pressure which is determined by the spring force of the elastic member 65, after that the fuel pressure inside the adjustment chamber 61 will be substantially maintained at the certain fuel pressure which is determined by the spring force of the elastic member 65. Therefore, while the pressurizing piston 64 is moving, that is, during the second part injection period Y, as shown in FIG. 9, the amount of injection of hydrocarbons from the hydrocarbon feed valve 15 per unit time is maintained at substantially the same injection amount. Next, if fuel injection ends, the action of feed of pressurized fuel from the pressurizing pump 66 causes the fuel pressure inside the adjustment chamber 61 to start to rise. Therefore, the injection pump 60 can provide a difference in the amount of injection of hydrocarbons from the hydrocarbon feed valve 15 per unit time between the first part X and the second part Y during one injection period.

If the volume of the adjustment chamber 61 is increased by the adjustment piston 62, the amount of pressurized fuel in the adjustment chamber 61 increases. If the amount of pressurized fuel in the adjustment chamber 61 increases, the amount of injection in the first part injection period X increases. On the other hand, if the volume of the adjustment chamber 61 is constant, the injection pressure in the first part injection period X becomes higher the higher the fuel pressure in the adjustment chamber 61 which is determined by the relief pressure of the relief valve 68. Therefore, the injection amount and the injection pressure in the first part injection period X can be freely set by changing the relief pressure and the volume of the adjustment chamber 61.

Now, as mentioned above, in the present invention, $NO_x$ in the exhaust gas is removed by the produced reducing intermediates, and, in this case, in order to remove $NO_x$ in the exhaust gas well by the produced reducing intermediates, it is necessary to hold these reducing intermediates on the basic layer 53, that is, the basic exhaust gas flow surface parts 54, until the produced reducing intermediates R—NCO and R—$NH_2$ react with the $NO_x$ in the exhaust gas, the active $NO_x^*$ and oxygen or break down themselves. For this reason, in the exhaust purification catalyst 13 used in the present invention, the basic exhaust gas flow surface parts 54 are provided.

On the other hand, as mentioned previously, if lengthening the feed period of the hydrocarbons, the length of time during which the oxygen concentration becomes higher becomes longer in the period after the hydrocarbons are fed until the hydrocarbons are next fed. Therefore, the active $NO_x^*$ is absorbed in the basic layer 53 in the form of nitrates without producing reducing intermediates. To avoid this, it is necessary to make the concentration of hydrocarbons which flow into the exhaust purification catalyst 13 vibrate within a predetermined range of period.

Therefore, in the embodiment of the present invention, to make the $NO_x$ which is contained in the exhaust gas and the reformed hydrocarbons react and produce the reducing intermediates R—NCO and R—$NH_2$ containing nitrogen and hydrocarbons, the precious metal catalysts 51 are carried on the exhaust gas flow surface of the exhaust purification catalyst 13. To hold the produced reducing intermediates R—NCO and R—$NH_2$ inside the exhaust purification catalyst 13, the basic exhaust gas flow surface parts 54 are formed around the precious metal catalysts 51. The reducing intermediates R—NCO and R—$NH_2$ which are held on the basic exhaust gas flow surface parts 54 are converted to $N_2$, $CO_2$, and $H_2O$. The vibration period of the hydrocarbon concentration is made the vibration period required for continuation of the production of the reducing intermediates R—NCO and R—$NH_2$. Incidentally, in the example shown in FIG. 4, the injection interval is made 3 seconds.

Figure 10A:
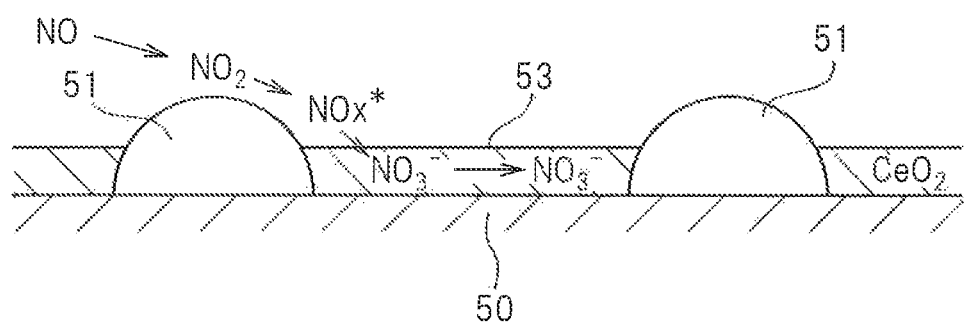
FIGS. 10A and 10B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediates R—NCO and R—$NH_2$ disappear from the surface of the basic layer 53. At this time, the active $NO_x^*$ which was produced on the platinum Pt 53, as shown in FIG. 10A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 10B:
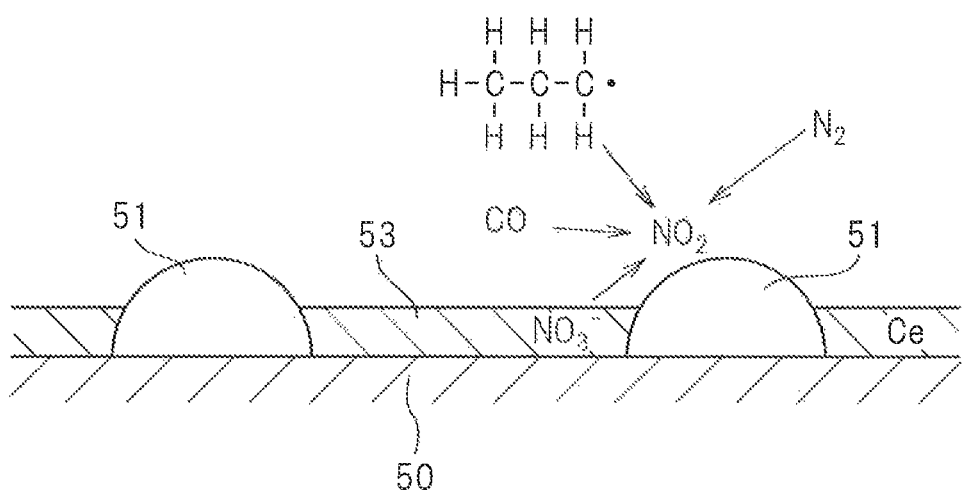

On the other hand, FIG. 10B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 10B, are released from the basic layer 53 in the form of $NO_2$. Next, the released $NO_2$ is reduced by the hydrocarbons HC and CO contained in the exhaust gas.

Figure 11:
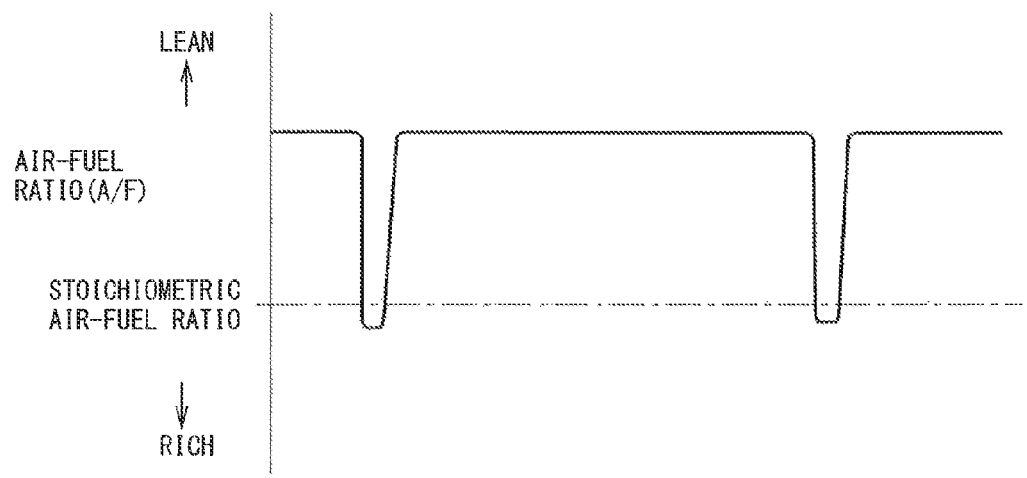
FIG. 11 is a view which shows changes in an air-fuel ratio of exhaust gas which flows into an exhaust purification catalyst.

FIG. 11 shows the case of making the air-fuel ratio (A/F) of the exhaust gas which flows into the exhaust purification catalyst 13 temporarily rich slightly before the $NO_x$ absorption ability of the basic layer 53 becomes saturated. Note that, in the example shown in FIG. 11, the time interval of this rich control is 1 minute or more. In this case, the $NO_x$ which was absorbed in the basic layer 53 when the air-fuel ratio (A/F) of the exhaust gas was lean is released all at once from the basic layer 53 and reduced when the air-fuel ratio (A/F) of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of "storage" as a term including both "absorption" and "adsorption", at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 12:
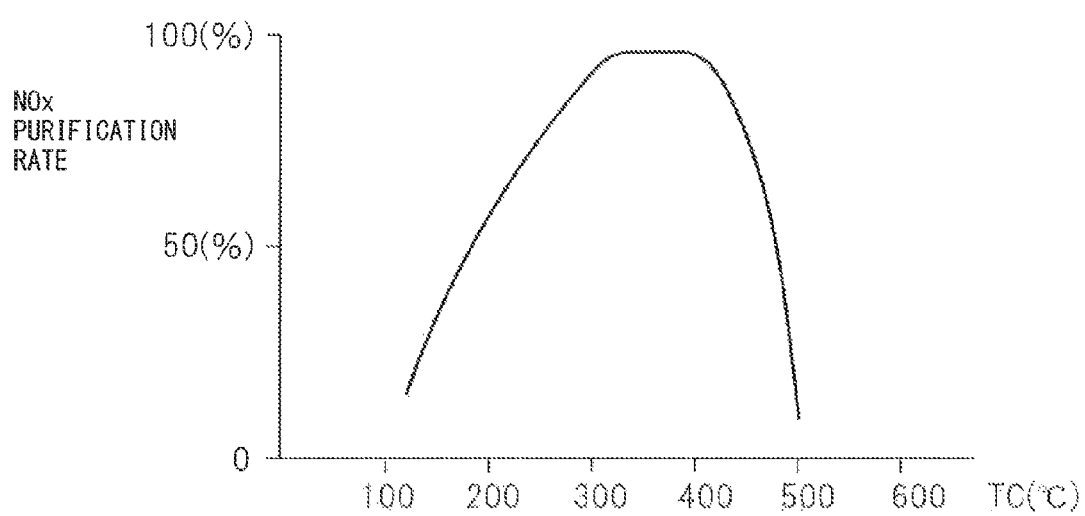
FIG. 12 is a view which shows an $NO_x$ purification rate.

FIG. 12 shows the $NO_x$ purification rate when making the exhaust purification catalyst 13 function as an $NO_x$ storage catalyst in this way. Note that, the abscissa of the FIG. 12 shows the catalyst temperature TC of the exhaust purification catalyst 13. When making the exhaust purification catalyst 13 function as an $NO_x$ storage catalyst, as shown in FIG. 12, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIG. 7C, as will be understood from FIGS. 7A, 7B and 7C, nitrates are not formed or even if formed are extremely small in amount, consequently, as shown in FIG. 5, even when the catalyst temperature TC is high, a high $NO_x$ purification rate is obtained.

That is, the $NO_x$ purification method which is shown from FIG. 4 to FIG. 7C can be said to be a new $NO_x$ purification method designed to remove $NO_x$ without forming almost any nitrates in the case of using an exhaust purification catalyst which carries precious metal catalysts and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the "first $NO_x$ removal method".

Figure 13:
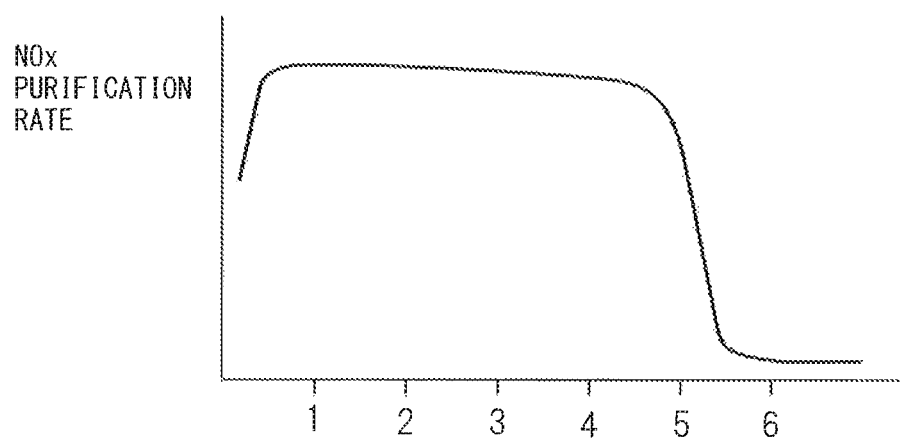
FIG. 13 is a view which shows a relationship between an injection period ΔT of hydrocarbon and an $NO_x$ purification rate.

As mentioned previously, if the vibration period ΔT of the hydrocarbon concentration becomes longer, that is, if the injection period of hydrocarbon from the hydrocarbon feed valve 15 becomes longer, the time period where the oxygen concentration around the active $NO_x^*$ becomes higher becomes longer in the time period after the hydrocarbons are fed to when the hydrocarbons are next fed. In this case, in the embodiment which is shown in FIG. 1, if the injection period ΔT of hydrocarbon becomes longer than about 5 seconds, the active $NO_x^*$ starts to be absorbed in the form of nitrates inside the basic layer 53. Therefore, as shown in FIG. 13, if the injection period ΔT of hydrocarbon becomes longer than about 5 seconds, the $NO_x$ purification rate falls. Therefore, the injection period ΔT of hydrocarbon has to be made 5 seconds or less.

On the other hand, in this embodiment according to the present invention, if the injection period ΔT of hydrocarbon becomes about 0.3 second or less, the fed hydrocarbons start to build up on the exhaust gas flow surface of the exhaust purification catalyst 13, therefore, as shown in FIG. 13, if the injection period ΔT of hydrocarbon becomes about 0.3 second or less, the $NO_x$ purification rate fails. Therefore, in the present invention, the inject ion period of hydrocarbon is made from 0.3 second to 5 seconds.

Figure 14:
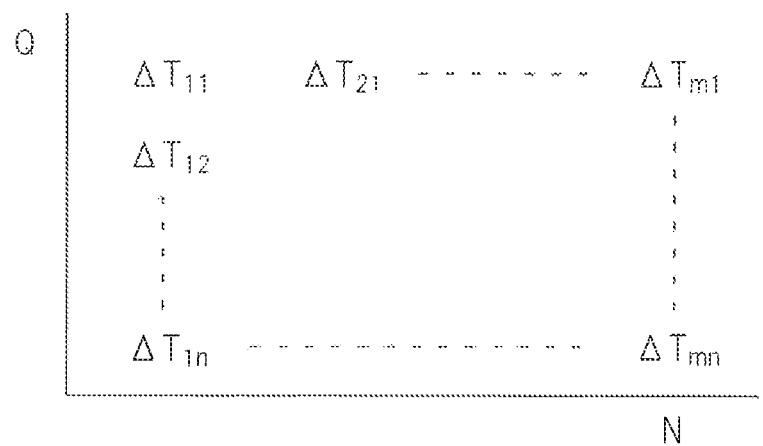
FIG. 14 is a view which shows a map of an injection period ΔT of hydrocarbon.

In this embodiment according to the present invention, the optimum injection period $\Delta T$ of hydrocarbons from the hydrocarbon feed valve 15 giving a good $NO_x$ purification rate is found in advance by experiments. This optimum injection period $\Delta T$ of hydrocarbons is stored as a function of the injection amount Q from the fuel injector 3 and the engine speed N in the form of a map such as shown in FIG. 14 in advance in the ROM 32. Further, the amount of $NO_x$ which is exhausted from the engine per unit time increases the greater the injection amount Q from the fuel injector 3 and increases the higher the engine speed N. Therefore, in this embodiment of the present invention, to remove well the $NO_x$ which is exhausted from the engine, as shown in FIG. 15A, the injection pressure P of the hydrocarbon feed valve 15 is made to increase the greater the injection amount Q from the fuel injector 3 and is made to increase the higher the engine speed N (P1<P2<P3<P4), or, as shown in FIG. 15B, the injection amount W from the hydrocarbon feed valve 15 is made to increase the greater the injection amount Q from the fuel injector 3 and is made to increase the higher the engine speed N (W1<W2<W3<W4).

Figure 15A:
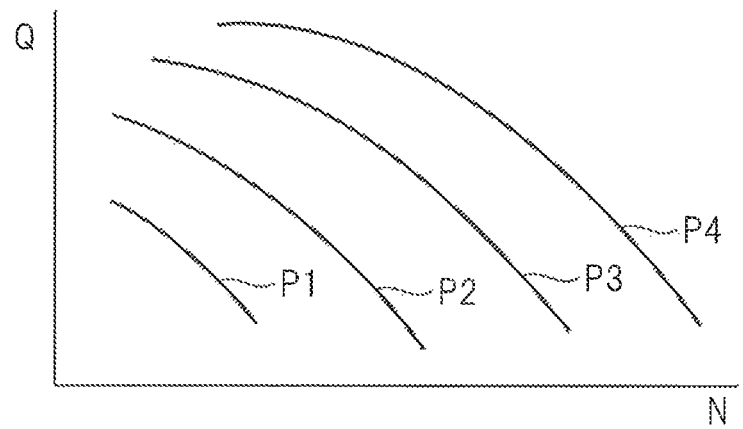
FIGS. 15A and 15B are views which show an injection pressure of an injection pump, etc.
Figure 15B:
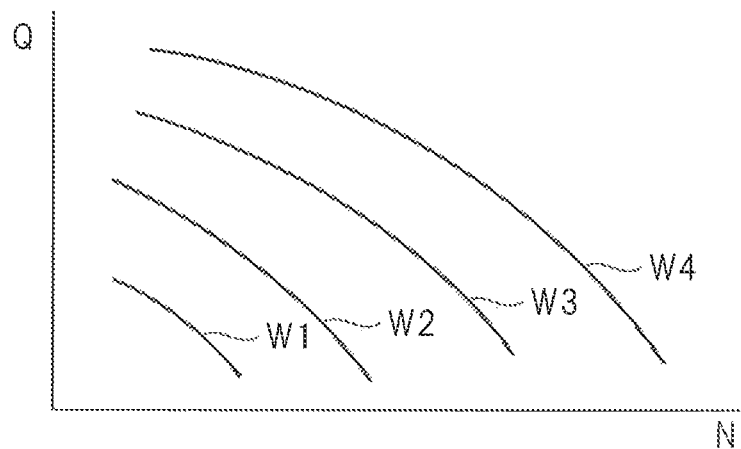

In the embodiment according to the present invention, the relief valve 68 of the injection pump 60 is controlled so that injection pressure of the hydrocarbon feed valve 15 becomes the injection pressure P which is shown in FIG. 15A or the actuator 63 of the injection pump 60 is controlled so that the injection amount from the hydrocarbon feed valve 15 becomes the injection amount W which is shown in FIG. 15B. In this case, if the injection pressure of the hydrocarbon feed valve 15 is increased, the amount of injection of hydrocarbons in the first part injection period X increases, and if the amount of injection of the hydrocarbon feed valve 15 is made to increase, the amount of injection of hydrocarbons in the first part injection period X also increases. That is, in this embodiment of the present invention, the amount of injection of hydrocarbons which is injected during the first part injection period X is made to increase the higher the engine load. Note that, the control of the amount of injection of hydrocarbons such as shown in FIG. 6 can also be performed using a hydrocarbon feed valve which can change the amount of injection of hydrocarbons during the injection of hydrocarbons to two stages.

Next, referring to FIG. 16 to FIG. 19, an $NO_x$ purification method when making the exhaust purification catalyst 13 function as an $NO_x$ storage catalyst will be explained specifically. The $NO_x$ purification method in the case of making the exhaust purification catalyst 13 function as an $NO_x$ storage catalyst in this way will be referred to below as the "second $NO_x$ removal method".

Figure 16:
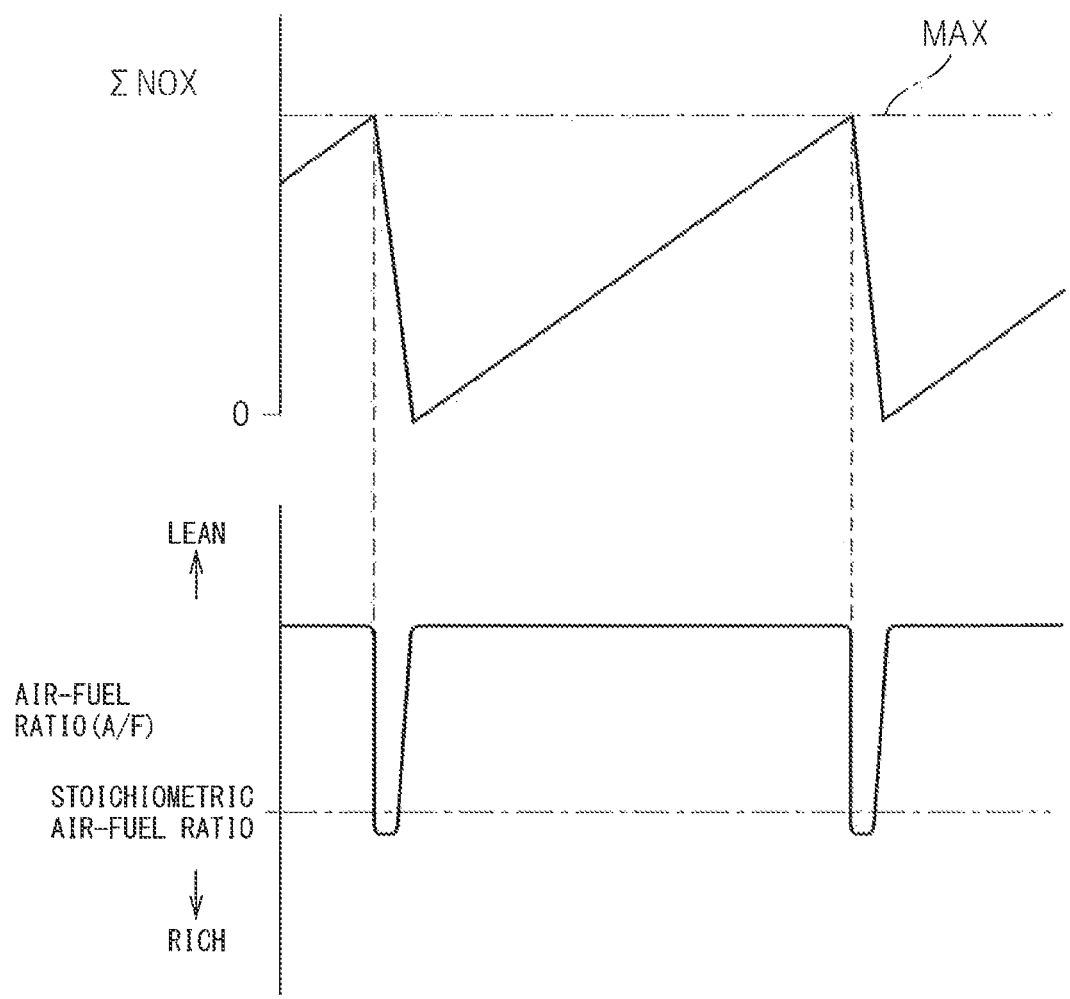
FIG. 16 is a view which shows $NO_x$ release control.

In this second $NO_x$ removal method, as shown in FIG. 16, when the stored $NO_x$ amount $\Sigma NOX$ of $NO_x$ which is stored in the basic layer 53 exceeds a predetermined allowable amount MAX, the air-fuel ratio (A/F) of the exhaust gas flowing into the exhaust purification catalyst 13 is temporarily made rich. If the air-fuel ratio (A/F) of the exhaust gas is made rich, the $NO_x$ which was stored in the basic layer 53 when the air-fuel ratio (A/F) of the exhaust gas was lean is released from the basic layer 53 all at once and reduced. Due to this, the $NO_x$ is removed.

Figure 17:
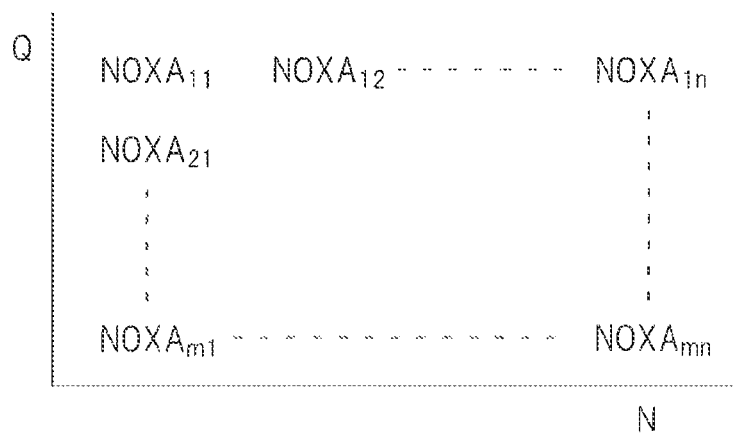
FIG. 17 is a view which shows a map of an exhausted $NO_x$ amount NOXA.

The stored $NO_x$ amount $\Sigma NOX$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 17 in advance in the ROM 32. The stored $NO_x$ amount $\Sigma NOX$ is calculated from the exhausted $NO_x$ amount NOXA. In this case, as explained before, the period during which the air-fuel ratio (A/F) of the exhaust gas is made rich is usually 1 minute or more.

Figure 18:
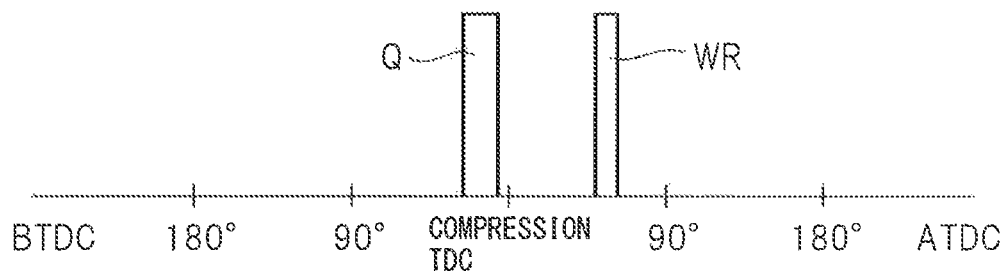
FIG. 18 is a view which shows a fuel injection timing.
Figure 19:
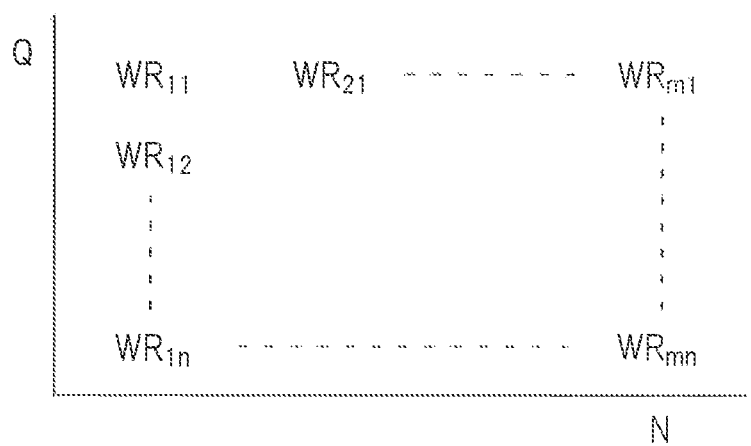
FIG. 19 is a view which shows a map of a fuel amount WR of hydrocarbon.

In this second $NO_x$ removal method, as shown in FIG. 18, in each combustion chamber 2, the fuel injector 3 injects additional fuel WP in addition to the combustion-use fuel Q so that the air-fuel ratio (A/F) of the exhaust gas which flows into the exhaust purification catalyst 13 is made rich. Note that, in FIG. 18, the abscissa indicates the crank angle. This additional fuel WR is injected at a timing at which it will burn, but will not appear as engine output, that is, slightly before ATDC 90° after compression top dead center. This fuel amount WP is stored as a function of the injection amount Q and engine speed N in the form of a map such as shown in FIG. 19 in advance in the ROM 32. Of course, in this case, it is also possible to make the injection amount of hydrocarbons from the hydrocarbon feed valve 15 increase so as to make the air-fuel ratio (A/F) of the exhaust gas rich.

Figure 20:
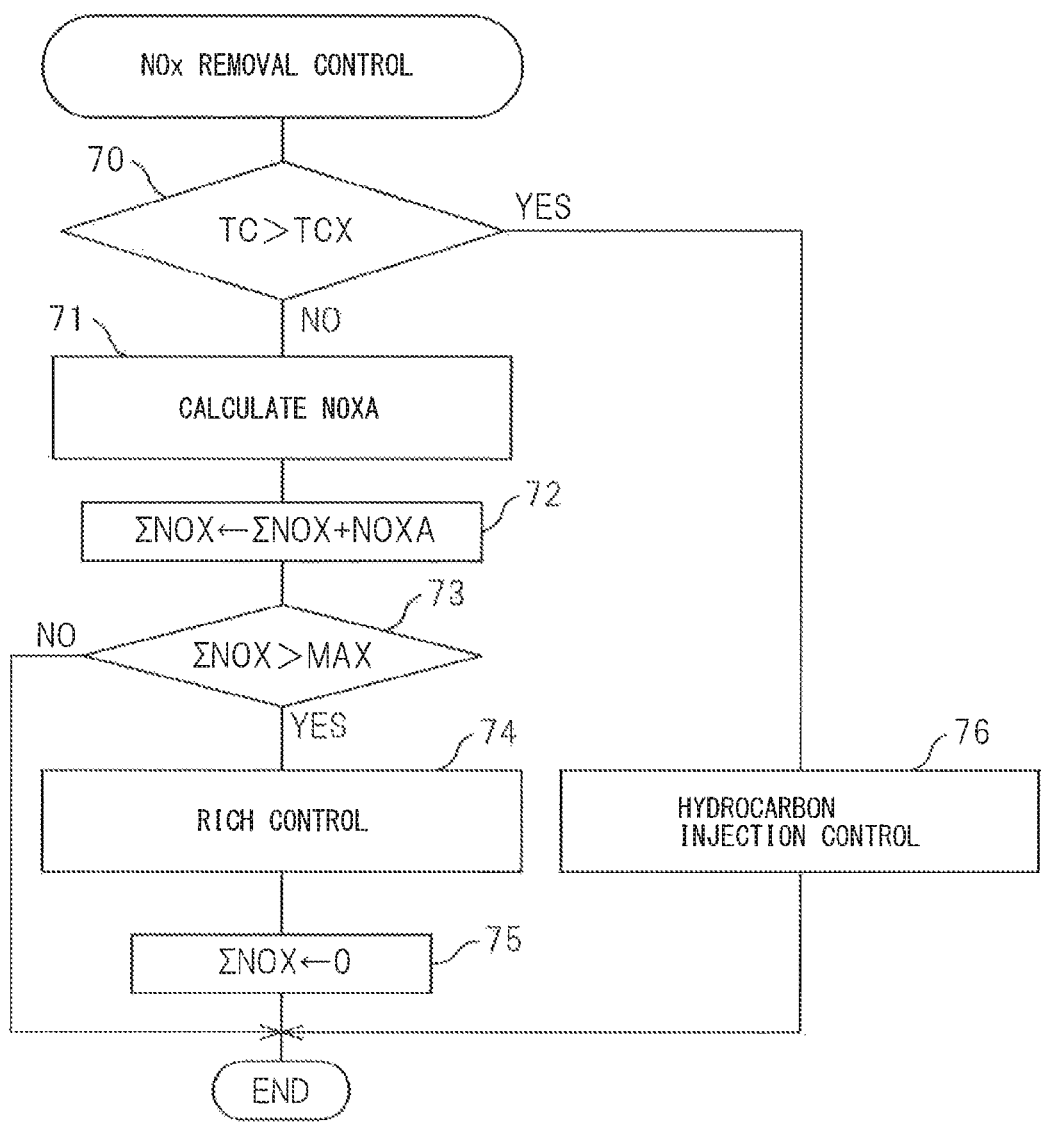
FIG. 20 is a flow chart for $NO_x$ removal control.

FIG. 20 shows the $NO_x$ removal control routine. This routine is executed by interruption every fixed time. Referring to FIG. 20, first, at step 70, it is judged based on the output signal of the temperature sensor 25 if the temperature TC of the exhaust purification catalyst 13 becomes the set temperature TCX, for example, 400° C., or more. When the temperature TC of the exhaust purification catalyst 13 is the set temperature TCX or less, the routine proceeds to step 71 where the $NO_x$ removal action by the second $NO_x$ removal method is performed.

That is, at step 71, the $NO_x$ amount NOXA which is exhausted per unit time is calculated from the map which is shown in FIG. 17. Next, at step 72, the exhausted $NO_x$ amount NOXA is added to $\Sigma NOX$ to calculate the stored $NO_x$ amount $\Sigma NOX$. Next, at step 73, it is judged if the stored $NO_x$ amount $\Sigma NOX$ exceeds the allowable value MAX. If $\Sigma NOX > MAX$, the routine proceeds to step 74 where the additional fuel amount WE is calculated from the map which is shown in FIG. 19 and the injection action of additional fuel is performed. Next, at step 75, $\Sigma NOX$ is cleared.

On the other hand, when it is judged at step 70 that the temperature TC of the exhaust purification catalyst 13 exceeds the set temperature TCX, the routine proceeds to step 76 where the $NO_x$ removal action by the first $NO_x$ removal method is performed. That is, the injection pressure of the hydrocarbon feed valve 15 is made the injection pressure P which is shown in FIG. 15A or the injection amount from the hydrocarbon feed valve 15 is made the injection amount W which is shown in FIG. 15B and hydrocarbons are injected from the hydrocarbon feed valve 15 by the injection period $\Delta T$ which is calculated from the map shown in FIG. 14. At this time, the amount of injection per unit time of the hydrocarbons from the hydrocarbon feed valve 15 changes as shown in FIG. 6.

Note that, as another embodiment, it is also possible to arrange an oxidation catalyst for reforming the hydrocarbons in the engine exhaust passage upstream of the exhaust purification catalyst 13.

REFERENCE SIGNS LIST 4 intake manifold
5 exhaust manifold
7 exhaust turbocharger
12a, 12b exhaust pipe 13 exhaust purification catalyst
14 particulate filter
15 hydrocarbon feed valve

The invention claimed is:

1. An exhaust purification system of an internal combustion engine in which an exhaust purification catalyst is arranged in an engine exhaust passage, a hydrocarbon feed valve is arranged in the engine exhaust passage upstream of the exhaust purification catalyst, a precious metal catalyst is carried on an exhaust gas flow surface of the exhaust purification catalyst, a basic exhaust gas flow surface part is formed around the precious metal catalyst, the exhaust purification catalyst has a property of reducing $NO_x$ which is contained in an exhaust gas when making a concentration of hydrocarbons flowing into the exhaust purification catalyst vibrate within a predetermined range of amplitude and within a predetermined range of period and has a property of being increased in storage amount of $NO_x$ which is contained in the exhaust gas if making the vibration period of the hydrocarbon concentration longer than the predetermined range, and hydrocarbons are injected from the hydrocarbon feed valve for a period within the predetermined range at the time of engine operation to thereby remove $NO_x$ which is contained in the exhaust gas, wherein:
a difference is set between an injection amount of hydrocarbons in a first part of one injection period and an injection amount of hydrocarbons in a second part of the injection period when hydrocarbons are repeatedly injected from the hydrocarbon feed valve for a period within the predetermined range,
in the first part of the injection period, the amount of injection of hydrocarbons per unit time is set to an injection amount required for making an air-flow ratio of the exhaust gas flowing into the exhaust purification catalyst rich, and
in the second part of the injection period, an injection action of hydrocarbons is continued for a longer time than during the first part of the injection period when the amount of injection of hydrocarbons per unit time of the second part of the injection period is set to an injection amount smaller than the first part of the injection period.

2. The exhaust purification system of an internal combustion engine as claimed in claim 1, wherein when shifting from the first part of the injection period to the second part of the injection period, the amount of injection of hydrocarbons from said hydrocarbon feed valve per unit time is reduced to the amount of injection of hydrocarbons per unit time in the second part of the injection period, then is maintained at the amount of injection of hydrocarbons per unit time in the second part of the injection period, and the amount of injection of hydrocarbons per unit time during the second part injection period is maintained at the same injection amount.

3. The exhaust purification system of an internal combustion engine as claimed in claim 2, wherein the amount of injection of hydrocarbons injected in the first part of the injection period is made to increase as the the engine load increases.

4. The exhaust purification system of an internal combustion engine as claimed in claim 1, wherein an injection pump for feeding pressurized hydrocarbons to said hydrocarbon feed valve is provided, and said injection pump can provide a difference in the amount of injection of hydrocarbons from said hydrocarbon feed valve per unit time between the first part and the second part of the injection period.

5. The exhaust purification system of an internal combustion engine as claimed in claim 4, wherein the injection pump has an adjustment chamber which is filled with pressurized hydrocarbons for feeding to the hydrocarbon feed valve, and the amount of injection of hydrocarbons per unit time in the second part of the injection period is maintained at the same injection amount by pressing the pressurized hydrocarbons in the adjustment chamber by using an elastic member.

6. The exhaust purification system of an internal combustion engine as claimed in claim 1, wherein a reducing intermediate which contains nitrogen and hydrocarbons for removing $NO_x$ is produced by continuing an injection action of hydrocarbons for a longer time than during the first part injection period when the amount of injection of hydrocarbons per unit time in the second part of the injection period is set to an injection amount smaller than the first part of the injection period, and $NO_x$ contained in the exhaust gas is removed by said reducing intermediate.

7. The exhaust purification system of an internal combustion engine as claimed in claim 6, wherein the amount of injection of hydrocarbons injected in the first part of the injection period is an amount required for consuming an oxygen, and the amount of injection of hydrocarbons per unit time in the second part of the injection period is made an amount required for producing a reducing intermediate which contains nitrogen and hydrocarbons.

8. The exhaust purification system of an internal combustion engine as claimed in claim 1, wherein a first $NO_x$ removal method which removes $NO_x$ contained in the exhaust gas by injecting hydrocarbons from the hydrocarbon feed valve by a period within the predetermined range and a second $NO_x$ removal method which removes $NO_x$ by switching an air-fuel ratio flowing into the exhaust purification catalyst from lean to rich at an interval longer than the period within the predetermined range are used, and a difference is set between an injection amount of hydrocarbons in a first part of the injection period and an injection amount of hydrocarbons in a second part of the injection period when hydrocarbons are repeatedly injected from the hydrocarbon feed valve for a period within the predetermined range when the first $NO_x$ removal method is used, in the first part of the injection period, the amount of injection of hydrocarbons per unit time is made an injection amount required for making an air-flow ratio of the exhaust gas flowing into the exhaust purification catalyst rich, and in the second part of the injection period, an injection action of hydrocarbons is continued over a longer time than the first part of the injection period in a state where the amount of injection of hydrocarbons per unit time is set to an injection amount smaller than the first part of the injection period.

* * * * *